United States Patent
Min (10) Patent No.: US 9,738,164 B2
(45) Date of Patent: Aug. 22, 2017

(54) STABLE POWER SUPPLY DEVICE FOR HIGH VOLTAGE BATTERY SYSTEM

(71) Applicants: Hyundai Motor Company, Seoul (KR); Kia Motors Corporation, Seoul (KR)

(72) Inventor: Kyung In Min, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 280 days.

(21) Appl. No.: 14/535,146

(22) Filed: Nov. 6, 2014

(65) Prior Publication Data
US 2015/0258901 A1     Sep. 17, 2015

(30) Foreign Application Priority Data
Mar. 14, 2014   (KR) .................. 10-2014-0030012

(51) Int. Cl.
*B60L 11/18*     (2006.01)

(52) U.S. Cl.
CPC ........ *B60L 11/1803* (2013.01); *B60L 11/1875* (2013.01); *B60L 2270/20* (2013.01); *Y02T 10/7005* (2013.01); *Y02T 10/705* (2013.01)

(58) Field of Classification Search
CPC .............. B60L 11/1803; B60L 11/1875; B60L 2270/20; Y02T 10/705; Y02T 10/7005
See application file for complete search history.

(56) References Cited

U.S. PATENT DOCUMENTS

| | | | | |
|---|---|---|---|---|
| 5,994,789 A * | 11/1999 | Ochiai | ............... | B60L 11/1803 180/65.1 |
| 6,753,651 B1 * | 6/2004 | Goral | ..................... | H02J 9/065 307/64 |
| 6,943,327 B2 * | 9/2005 | Fabregas | .............. | B60N 2/5685 219/202 |
| 7,258,169 B2 * | 8/2007 | Fripp | ................. | E21B 41/0085 166/302 |
| 7,579,709 B2 * | 8/2009 | Goetz | ..................... | B60K 6/48 307/10.1 |
| 8,148,943 B2 * | 4/2012 | Forslow | ............... | B60L 3/0046 307/326 |
| 8,247,920 B2 * | 8/2012 | Hirasawa | .............. | B60K 6/445 307/132 EA |

(Continued)

FOREIGN PATENT DOCUMENTS

JP     2007-099141         4/2007
JP     2009-240097 A     10/2009
(Continued)

*Primary Examiner* — Naum B Levin
(74) *Attorney, Agent, or Firm* — Mintz Levin Cohn Ferris Glovsky and Popeo, P.C.; Peter F. Corless (57) ABSTRACT

A stable power supply device for a high voltage battery system in a vehicle enables the voltage of a capacitor in a high voltage component to be gradually increased at an initial stage of ignition, using a heat generating resistor of a temperature raising system mounted to raise the temperature of a battery in the vehicle. Further, the stable power supply device enables a capacitor in a high voltage component to be discharged using a heat generating resistor of a temperature raising system after the ignition of the vehicle is off, thereby ensuring the stability of the system.

12 Claims, 6 Drawing Sheets

(56) References Cited

U.S. PATENT DOCUMENTS

| | | | | |
|---|---|---|---|---|
| 8,305,047 | B2* | 11/2012 | Lin | H02M 1/126 |
| | | | | 320/166 |
| 8,497,031 | B2* | 7/2013 | Reischmann | B60L 11/1875 |
| | | | | 320/121 |
| 8,729,864 | B2* | 5/2014 | Dittmer | B60L 3/0007 |
| | | | | 320/128 |
| 8,816,647 | B2* | 8/2014 | Xu | H01M 10/6572 |
| | | | | 320/150 |
| 8,981,683 | B2* | 3/2015 | Hambitzer | H01M 10/4207 |
| | | | | 318/139 |
| 9,018,866 | B2* | 4/2015 | Ashida | H02P 31/00 |
| | | | | 318/139 |
| 9,209,737 | B2* | 12/2015 | Funaba | H02J 7/0036 |
| 9,321,350 | B2* | 4/2016 | Yokoyama | H01M 10/44 |
| 2003/0029654 | A1 | 2/2003 | Shimane et al. | |
| 2009/0000778 | A1* | 1/2009 | Nathan | B60H 1/00735 |
| | | | | 165/202 |
| 2011/0006726 | A1* | 1/2011 | Dittmer | B60L 3/0007 |
| | | | | 320/101 |
| 2011/0057627 | A1* | 3/2011 | Kuehner | B60L 3/0046 |
| | | | | 320/166 |
| 2011/0234177 | A1* | 9/2011 | Kohara | H02M 1/36 |
| | | | | 320/166 |
| 2011/0241581 | A1* | 10/2011 | Flock | B60L 3/04 |
| | | | | 318/400.3 |
| 2013/0093427 | A1* | 4/2013 | Bemrich | G01R 31/3278 |
| | | | | 324/418 |
| 2013/0193920 | A1* | 8/2013 | Dickerhoof | H02J 7/02 |
| | | | | 320/109 |
| 2014/0210260 | A1* | 7/2014 | Hirose | B60L 3/04 |
| | | | | 307/10.1 |
| 2015/0105956 | A1* | 4/2015 | Wu | B60L 11/1875 |
| | | | | 701/22 |

FOREIGN PATENT DOCUMENTS

| | | |
|---|---|---|
| KR | 10-1998-0075212 A | 11/1998 |
| KR | 10-2009-0048456 | 5/2009 |
| KR | 10-2010-0026603 | 3/2010 |
| KR | 10-2012-0136825 A | 12/2012 |
| WO | 2011/004247 A2 | 1/2011 |

* cited by examiner

FIG. 1

RELATED ART

STABLE POWER SUPPLY DEVICE FOR HIGH VOLTAGE BATTERY SYSTEM

CROSS-REFERENCE TO RELATED APPLICATION

This application claims under 35 U.S.C. §119(a) the benefit of Korean Patent Application No. 10-2014-0030012 filed on Mar. 14, 2014, the entire contents of which are incorporated herein by reference.

BACKGROUND (a) Technical Field

The present disclosure relates to a stable power supply device for a high voltage battery system in a vehicle. More particularly, the present disclosure relates to a stable power supply device for a high voltage battery system, which uses a resistor of a temperature raising system for raising the temperature of a high voltage battery in a vehicle during precharging at an initial stage of ignition.

(b) Background Art

In general, a high voltage battery system configured with a high voltage battery and high voltage components (e.g., an inverter, a low voltage DC to DC converter (LDC), a full automatic temperature control (FATC), and the like) using the high voltage battery as a power source can be mounted in a "green" vehicle, such as a hybrid electric vehicle (HEV) or an electric vehicle (EV). The high voltage battery system requires stable power at an initial stage of ignition to drive the high voltage components. To this end, the high voltage battery system stably supplies power to the high voltage components, e.g., using a high voltage relay and a high capacity resistor.

However, when a problem occurs with the high voltage components, the high capacity resistor, or the like, may be damaged, which causes damage of an undesired component, thereby resulting in an increase in repair cost of the component.

Figure 1:
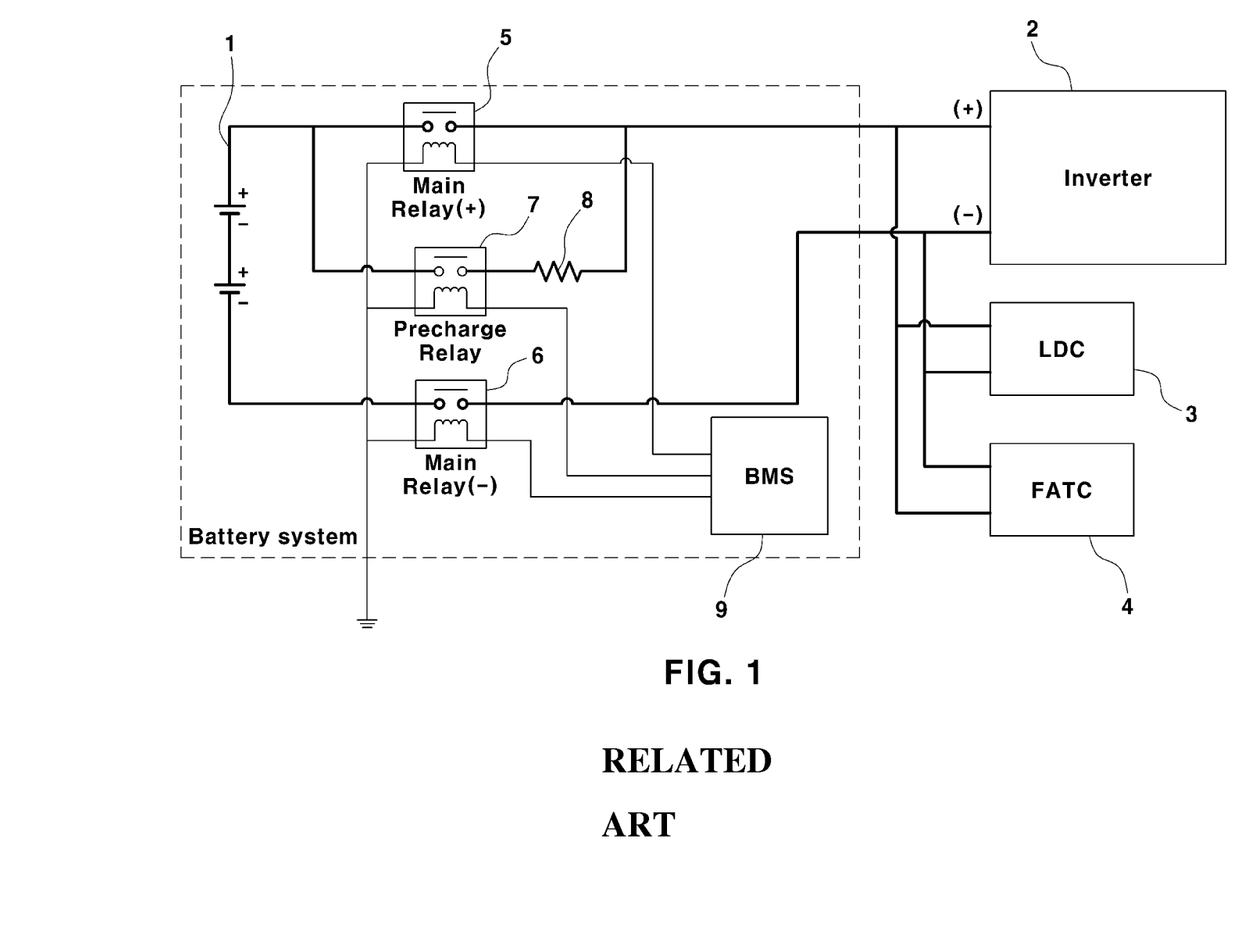
FIG. 1 is a circuit diagram illustrating, as an example, a conventional high voltage battery system for a green vehicle.

FIG. 1 illustrates, as an example, a conventional high voltage battery system for a green vehicle. As shown in FIG. 1, a conventional high voltage battery system includes a high voltage battery 1, high voltage components (e.g., an inverter 2, an LDC 3 and an FATC 4) using the high voltage battery 1 as a power source, and high voltage relays 5, 6 and 7 and a high capacity resistor 8 for precharge, configured to supply stable power to the high voltage components 2, 3 and 4. The operation of each high voltage relay 5, 6 or 7 is controlled by a battery management system (BMS) 9.

In the high voltage battery system of FIG. 1, as the on/off of each high voltage relay 5, 6 or 7 is operated according to a relay sequence in initial ignition of the vehicle, the voltage of a capacitor in the high voltage component(s) (e.g., the inverter, the LDC or the FATC) is increased. In this state, the voltage of the capacitor is gradually increased by the high capacity resistor 8 for precharge, and the current value of the system is changed depending on a difference between the voltage of the battery and the capacitor voltage by the high capacitor resistor 8. For example, if the capacitor voltage increases, the current value of the system decreases.

As such, the high capacity resistor 8 for precharge in the high voltage battery system plays an important role to supply stable power in initial ignition of the vehicle. Therefore, when the high capacity resistor for precharge is damaged due to the occurrence of an error in the high voltage battery system, ignition of the vehicle becomes impossible.

Since a certain degree of power remains in the capacitor in the high voltage component(s), even after the ignition of the vehicle is off, the remaining power of the capacitor is consumed through operations of other high voltage components. However, when one of the high voltage component(s) is broken, the remaining power of the capacitor in the high voltage component(s) is not consumed. Therefore, the remaining power remains in the system for a long period of time. If a high voltage line of the system is erroneously touched in this situation (i.e., in the state in which power remains in the capacitor), an accident such as electric shock may occur.

SUMMARY OF THE DISCLOSURE

The present disclosure provides a stable power supply device for a high voltage battery system in a vehicle, which enables the voltage of a capacitor in a high voltage component to be gradually increased at an initial stage of ignition, using a heat generating resistor of a temperature raising system mounted to raise the temperature of a battery in the vehicle. The present disclosure also provides a stable power supply device for a high voltage battery system in a vehicle, which enables a capacitor in a high voltage component to be discharged using a heat generating resistor of a temperature raising system after the ignition of the vehicle is off, thereby ensuring the stability of the system.

According to embodiments of the present disclosure, a stable power supply device for a high voltage battery system is provided in a vehicle, the stable power supply device including: a heat generating resistor portion connected to a high voltage battery through a power relay assembly constituted of one or more relays; a first branch circuit branched from a circuit between the high voltage battery and the power relay assembly to be connected to a circuit between the heat generating resistor portion and the power relay assembly; a precharge heat generating resistor installed in the first branch circuit, the precharge heat generating resistor preventing a sudden flow of current by delaying an increase in voltage at an initial stage of ignition; a high voltage component installed in a second branch circuit branched from an internal circuit of the power relay assembly, the high voltage component having a capacitor connected to the internal circuit of the power relay assembly; and a control unit connected to the power relay assembly to control an operation of each relay constituting the power relay assembly.

According to embodiments of the present disclosure, the power relay assembly may include a first main relay connected to a positive electrode terminal of the high voltage battery, the first main relay controlling a power supply of the battery; a second main relay connected to a negative electrode terminal of the high voltage battery, the second main relay controlling the power supply of the battery; a precharge relay connected between the first main relay and the heat generating resistor portion, the precharge relay operating at the initial stage of ignition to prevent a sudden flow of current; and a temperature raising relay connected between the second main relay and the heat generating resistor portion, the temperature raising relay operating after ignition of the vehicle is off to induce the capacitor in the high voltage component to be discharged.

According to embodiments of the present disclosure, the power relay assembly may have a temperature raising fuse installed between the second main relay and the temperature raising relay to cut off a flow of overcurrent.

According to embodiments of the present disclosure, the heat generating resistor portion may be configured with a plurality of heat generating resistors connected in series to one another.

According to embodiments of the present disclosure, the control unit may perform precharging of the capacitor in the high voltage component by operating only the precharge relay and the second main relay among the relays constituting the power relay assembly at the initial stage of ignition.

According to embodiments of the present disclosure, the control unit may remove a resistive element and allow power to be supplied to the high voltage component by operating only the first and second main relays among the relays constituting the power relay assembly after the precharging of the capacitor in the high voltage component is completed.

According to embodiments of the present disclosure, the control unit may allow remaining power of the capacitor in the high voltage component to be consumed through the heat generating resistor portion by operating only the precharge relay and the temperature raising relay among the relays constituting the power relay assembly after ignition of the vehicle is off.

As described above, the stable power supply device according to the present disclosure confers multiple advantages. First, the heat generating resistor of the temperature raising system can be used as a resistor for precharge, other than the conventional high capacity resistor for precharge, and hence a separate resistor for precharge is not required. Accordingly, it is possible to prevent resistor damage caused by overcurrent when a problem occurs in the system. Second, since the separate resistor for precharge is not required, cost reduction is possible by removing the conventional high capacity resistor for precharge. Third, the remaining power of the capacitor in the high voltage component can be quickly discharged through the heat generating resistor of the temperature raising system after the ignition of the vehicle is off, thereby ensuring the stability of the system.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one control unit. The term "control unit" refers to a hardware device that includes a memory and a processor. The memory is configured to store program instructions, and the processor is configured to execute the program instructions to perform one or more processes which are described further below.

In the present disclosure, a temperature raising system mounted in a vehicle to raise the temperature of a high voltage battery is used, rather than a high capacity resistor for precharge as is used in conventional high voltage battery systems at an initial stage of ignition of the vehicle. That is, in the present disclosure, a heat generating resistor constituting the temperature raising system is used as a resistor for precharge to enable the voltage of a capacitor in a high voltage component to be gradually and stably increased at an initial stage of ignition of the vehicle. Further, in the present disclosure, the capacitor is discharged by consuming the remaining power of the capacitor in the high voltage component through the heat generating resistor of the temperature raising system even after the ignition of the vehicle is off, so as to ensure the stability of the system.

Figure 2:
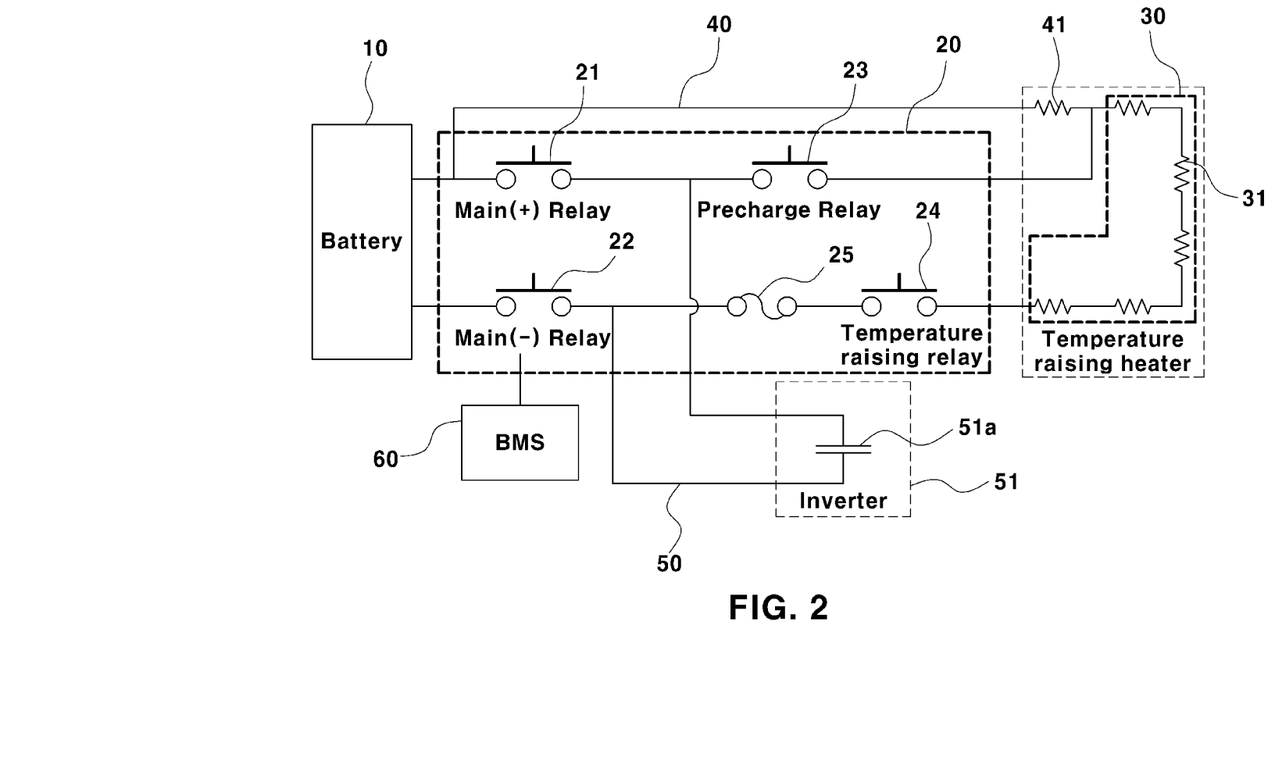
FIG. 2 is a circuit diagram illustrating a stable power supply device for a high voltage battery system in a vehicle according to embodiments of the present disclosure.

As shown in FIG. 2, a stable power supply device for a high voltage battery system in a vehicle according to embodiments of the present disclosure includes a heat generating resistor portion 30 connected to a high voltage battery 10 through a power relay assembly 20, in order to supply stable power to the high voltage battery 10 at an initial stage of ignition of the vehicle. The heat generating resistor portion 30 is configured with heat generating resistors of a temperature raising system mounted in the vehicle to raise the temperature of the high voltage battery 10.

Generally, a temperature raising system for a high voltage battery includes a temperature raising heater disposed in each battery module constituting the high voltage battery, and each temperature raising heater is configured with heat generating resistors, such as PTC resistors. The heat generating resistor portion 30 may be configured with a plurality of heat generating resistors 31 connected in series to one another.

Figure 3:
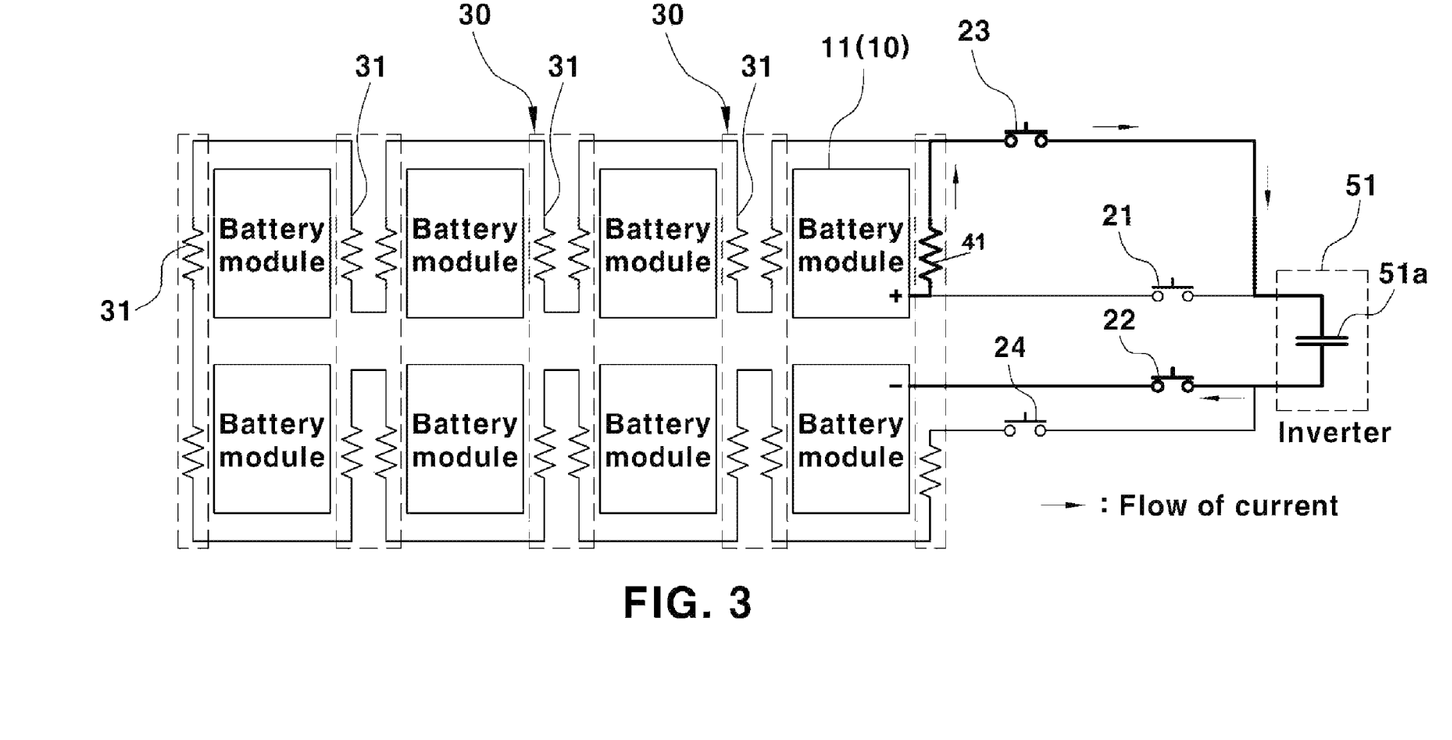
FIG. 3 is a circuit diagram illustrating the flow of current of the table power supply device according to embodiments of the present disclosure.

As shown in FIG. 3, the heat generating resistors 31 are disposed to surround each battery module 11 constituting the high voltage battery 10, thereby performing the heating function of a temperature raising heater. As shown in FIG. 2, the heat generating resistor portion 30 may be connected to the high voltage battery 10 through a separate first branch circuit 40.

The first branch circuit 40 is branched from a circuit between the high voltage battery 10 and the power relay assembly 20 to be connected to a circuit between the heat generating resistor portion 30 and the power relay assembly 20. A precharge heat generating resistor 41 is installed in the first branch circuit 40.

The precharge heat generating resistor 41 is used to prevent a sudden flow of current by delaying an increase in voltage at an initial stage of ignition. Like the resistors 31 constituting the heat generating resistor portion 30, a heat generating resistor such as a PTC resistor is applied to the precharge heat generating resistor 41.

One or more of the heat generating resistors constituting the temperature raising system is/are employed and used as the precharge heat generating resistor 41. Thus, the precharge heat generating resistor 41 can act as a resistor for precharge in the high voltage battery system, and simultaneously perform, together with the heat generating resistor portion 30, the heating function of the temperature raising heater.

As shown in FIG. 3, the precharge heat generating resistor 41 is disposed together with the resistors 31 of the heat generating resistor portion 30, to surround the battery module 11 of the high voltage battery, thereby performing the heating function as a heater for raising the temperature of the battery.

As shown in FIGS. 2 and 3, the precharge heat generating resistor 41 may be configured with only one resistor in order to reduce time for precharging at the initial stage of ignition. However, the present disclosure is not limited thereto, and the precharge heat generating resistor 41 may be configured with a plurality of resistors. That is, the precharge heat generating resistor 41 is configured with one or a plurality of heat generating resistors, to prevent a sudden flow of current of the system during precharging at the initial stage of ignition.

Meanwhile, a high voltage component 51 driven using power of the high voltage battery 10 is connected to the high voltage battery 10 through a separate second branch circuit 50. The second branch circuit 50 is formed to be branched from an internal circuit of the power relay assembly 20. Specifically, the second branch circuit 50 is branched from a circuit connected to output terminals of first and second main relays 21 and 22 constituting the power relay assembly 20 so that the current controlled through the main relays 21 and 22 can flow.

A capacitor 51a provided in the high voltage component 51 is installed in the second branch circuit 50 so that the high voltage component 51 can receive battery power controlled through the main relays 21 and 22. In FIG. 2, only an inverter has been illustrated as the high voltage component 51 which receives the battery power controlled through the main relays 21 and 22 and is connected in parallel to the heat generating resistor portion 30. However, the present disclosure is not limited thereto, and several high voltage components configured in the high voltage battery system, including a low voltage DC to DC converter (LDC), a full automatic temperature control (FATC) and the like, may be connected in parallel to the heat generating resistor portion 30.

In this state, the high voltage components, e.g., the inverter, the LDC, the FATC, and the like, may be installed in a branch circuit branched from the circuit (e.g., internal circuit of the power relay assembly) formed between the relays constituting the power relay assembly 20 to be connected in parallel to the heat generating resistor portion 30. The power relay assembly 20 is used to control the flow of current between the high voltage battery 10 and various kinds of components of the system. The power relay assembly 20 includes the first main relay 21 electrically connected to a positive electrode terminal of the high voltage battery 10, the second main relay 22 electrically connected to a negative electrode terminal of the high voltage battery 10, a precharge relay 23 connected between the first main relay 21 and the heat generating resistor portion 30, a temperature raising relay 24 connected between the second main relay 22 and the heat generating resistor portion 30, and a temperature raising fuse 25 connected between the second main relay 22 and the temperature raising relay 24.

The first and second main relays 21 and 22 are used to control the power supply of the high voltage battery 10, and one terminal of the first branch circuit 40 is connected to a circuit between the first main relay 21 and the high voltage battery 10. The precharge relay 23 is used to prevent a sudden flow of current of the system by being operated at the initial stage of ignition. The precharge relay 23 induces current output from the high voltage battery 10 in precharging at the initial stage of ignition to be applied to the high voltage component 51 by passing through the precharge heat generating resistor 41. Accordingly, it is possible to supply stable power to the high voltage component at the initial stage of ignition.

The temperature raising relay 24 is forcibly operated after the ignition of the vehicle is off, to induce the capacitor 51a to be discharged by consuming power remaining in the capacitor 51a of the high voltage component 51. After the ignition of the vehicle is off, the temperature raising relay 24 and the precharge relay 23 are forcibly operated so that the capacitor 51a of the high voltage component 51 is connected in series to the heat generating resistor portion 30. Thus, the remaining power of the capacitor 51a can be consumed.

The temperature raising fuse 25 performs a function to cut off the flow of overcurrent in a circuit between the second main relay 22 and the temperature raising relay 24. A control unit 60 for controlling an operation of each relay 21, 22, 23 or 24 is electrically connected to the power relay assembly 20.

Referring to FIG. 3, the control unit 60 enables precharging of the capacitor 51a in the high voltage component 51 by operating only the precharge relay 23 and the second main relay 22 among the relays 21 to 24 constituting the power relay assembly 20 at the initial stage of ignition of the vehicle. When only the precharge relay 23 and the second main relay 22 are operated, and the first main relay 21 and the temperature raising relay 24 are not operated, the flow of current which is output from the high voltage battery 10 and flows in the precharge heat generating resistor 41, the precharge relay 23, the high voltage component 51 and the second main relay 22 is formed as shown in FIG. 3, such that the precharging of the high voltage component 51 is performed.

Figure 4:
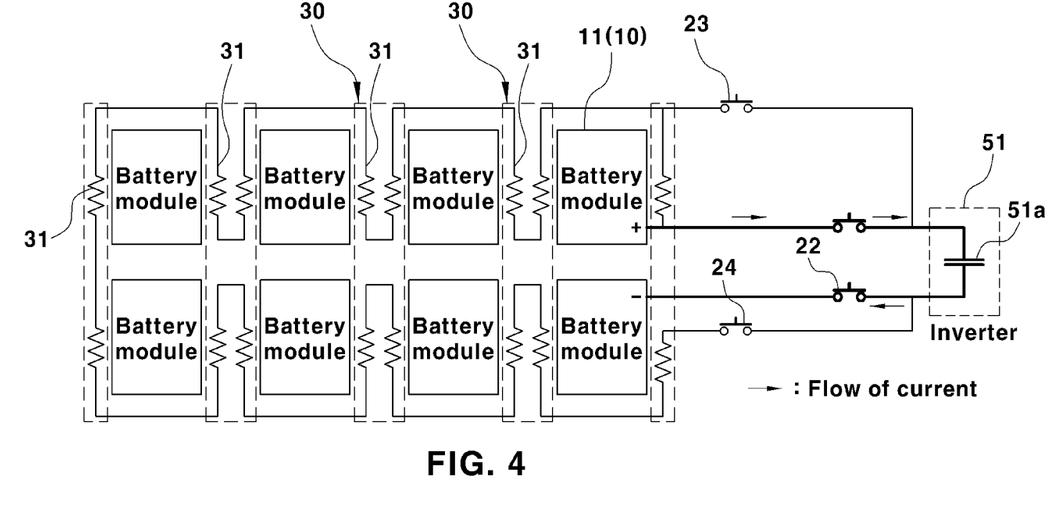
FIG. 4 is a circuit diagram illustrating the flow of current after the precharging of the stable power supply device is completed according to embodiments of the present disclosure.

Referring to FIG. 4, the control unit 60 removes a resistive element and allows power to be supplied to the high voltage component 51 by operating only the first and second main relays 21 and 22 among the relays 21 to 24 constituting the power relay assembly 20 after the precharging of the capacitor 51a in the high voltage component 51. When the first and second main relays 21 and 22 are operated, and the precharge relay 23 and the temperature raising relay 24 are not operated, the flow of current which is output from the high voltage battery 10 and flows in the first main relay 21, the high voltage component 51 and the second main relay 22 is formed as shown in FIG. 4, such that the power having the resistive element removed therefrom can be supplied to the high voltage component 51.

Figure 5:
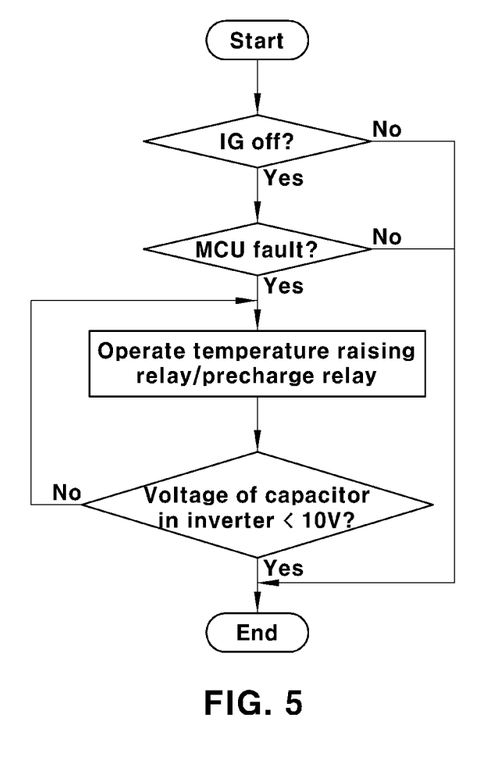
FIG. 5 is a flowchart illustrating a control process for consuming remaining power of a capacitor in a high voltage component after the ignition of the stable power supply device is off according to embodiments of the present disclosure.
Figure 6:
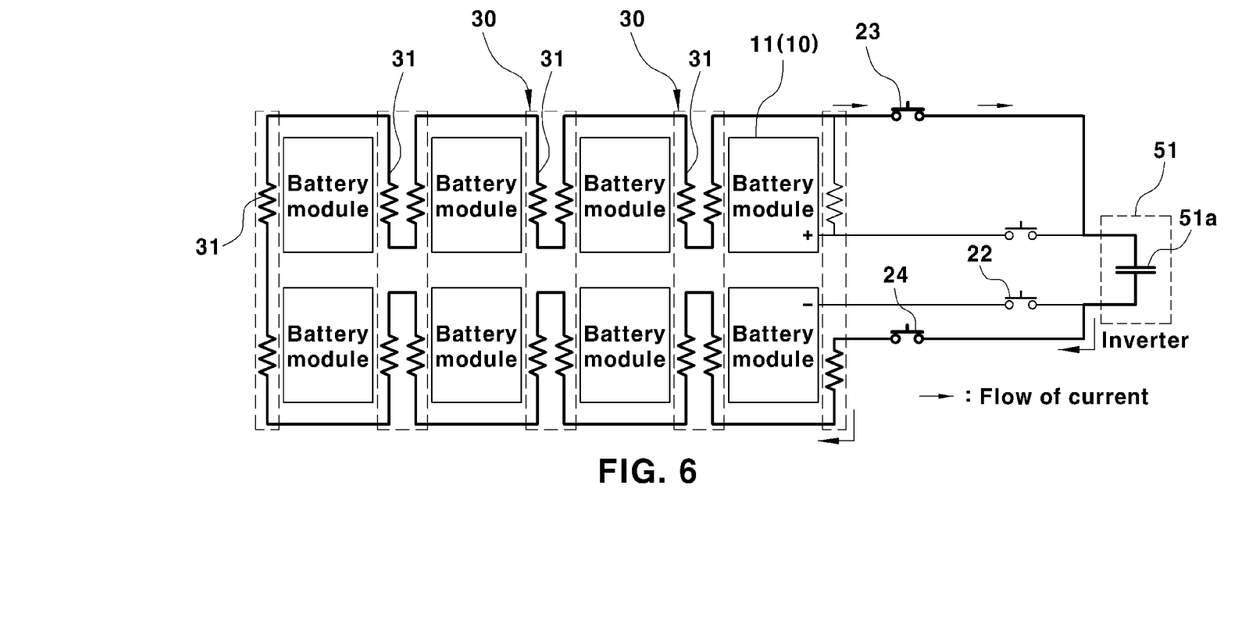
FIG. 6 is a circuit diagram illustrating the flow of current for consuming the remaining power of the capacitor in the high voltage component after the ignition of the stable power supply device is off according to embodiments of the present disclosure.

Referring to FIGS. 5 and 6, the control unit 60 forcibly operates only the precharge relay 23 and the temperature raising relay 24 among the relays 21 to 24 constituting the power relay assembly 20 after the ignition of the vehicle is off, so that the remaining power of the capacitor 51a in the high voltage component 51 is consumed through the heat generating resistor portion 30. In this state, the control unit 60 identifies and recognizes that the control of an MCU (not shown) for controlling a driving motor in the vehicle has failed after the ignition of the vehicle is off, and then operates the temperature raising relay 24 and the precharge relay 23.

When the precharge relay 23 and the temperature raising relay 24 are operated, and the first and second main relays 21 and 22 are not operated after the ignition of the vehicle is off, a circuit configured with the heat generating resistor portion 30, the precharge relay 23, the high voltage component 51 and the temperature raising relay 24 is formed as shown in FIG. 6, so that the remaining power of the capacitor 51a in the high voltage component 51 is consumed through the heat generating resistor portion 30. In this state, the heat generating resistor portion 30 is connected in series to the capacitor 51a in the high voltage component 51, to act as a resistor for discharging.

The control unit 60 forcibly operates the precharge relay 23 and the temperature raising relay 24 until the voltage of the capacitor 51a is lowered to a predetermined voltage or less so that the remaining power of the capacitor 51a in the high voltage component 51 is consumed, thereby discharging the capacitor 51a. When recognizing that the voltage of the capacitor 51a in the high voltage component 51 is lowered to the predetermined voltage or less by the power consumption of the heat generating resistor portion 30 after the ignition of the vehicle is off, the control unit 60 stops the operations of the precharge relay 23 and the temperature raising relay 24.

As described above, in the present disclosure, the heat generating resistor mounted as a temperature raising heater in a vehicle is used as a resistor for precharge, rather than the conventional high capacity resistor for precharge, and hence the conventional high capacity resistor for precharge is not required. Accordingly, it is possible to achieve the benefit of cost reduction.

The conventional high capacity resistor for precharge has a disadvantage in that, if overcurrent flows in the resistor, the resistor is damaged. However, in the PTC resistor used in the present disclosure, a resistive element increases as heat increases. Hence, although overcurrent flows in the resistor, only heat generation increases, but the resistor itself is not damaged.

Thus, it is possible to design a healthy system in which one high voltage component is not damaged even though another high current component is broken. Further, the operation of each relay can be controlled equally to that in normal times, without any change. In addition, the remaining power of the capacitor in the high voltage component can be quickly consumed and removed through the heat generating resistor portion after the ignition of the vehicle is off, thereby ensuring the stability of the system.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A stable power supply device for a high voltage battery system in a vehicle, the stable power supply device comprising:
   a heat generating resistor portion connected to a high voltage battery through a power relay assembly constituted of two or more relays;
   a first branch circuit branched from a first wire between the high voltage battery and the power relay assembly to be connected to a second wire between the heat generating resistor portion and the power relay assembly;
   a precharge heat generating resistor installed in the first branch circuit, the precharge heat generating resistor preventing a sudden flow of current by delaying an increase in voltage at an initial stage of ignition;
   a high voltage component installed in a second branch circuit branched from an internal circuit of the power relay assembly, the high voltage component having a capacitor connected to the internal circuit of the power relay assembly; and
   a control unit connected to the power relay assembly to control an operation of each relay constituting the power relay assembly,
   wherein the power relay assembly includes:

a first main relay connected to a positive electrode terminal of the high voltage battery, the first main relay controlling a power supply of the battery;

a second main relay connected to a negative electrode terminal of the high voltage battery, the second main relay controlling the power supply of the battery;

a precharge relay connected between the first main relay and the heat generating resistor portion, the precharge relay operating at the initial stage of ignition to prevent a sudden flow of current; and a temperature raising relay connected between the second main relay and the heat generating resistor portion, the temperature raising relay operating after ignition of the vehicle is off to induce the capacitor in the high voltage component to be discharged, and wherein one terminal of the second branch circuit is connected to a first connection between the first main relay and the precharge relay and the other terminal of the second branch circuit is connected to a second connection between the second main relay and the temperature raising relay.

2. The stable power supply device of claim 1, wherein the power relay assembly has a temperature raising fuse installed between the second main relay and the temperature raising relay to cut off a flow of overcurrent.

3. The stable power supply device of claim 1, wherein the heat generating resistor portion is configured with a plurality of heat generating resistors connected in series to one another.

4. The stable power supply device of claim 3, wherein each of the plurality of heat generating resistors is disposed in each battery module constituting the high voltage battery.

5. The stable power supply device of claim 3, wherein each of the heat generating resistors is a positive temperature coefficient (PTC) resistor.

6. The stable power supply device of claim 3, wherein each of the heat generating resistors is disposed to surround each battery module constituting the high voltage battery, thereby performing a heating function of a temperature raising heater.

7. The stable power supply device of claim 1, wherein the control unit performs precharging of the capacitor in the high voltage component by operating only the precharge relay and the second main relay among the relays constituting the power relay assembly at the initial stage of ignition.

8. The stable power supply device of claim 7, wherein the control unit removes a resistive element and allows power to be supplied to the high voltage component by operating only the first and second main relays among the relays constituting the power relay assembly after the precharging of the capacitor in the high voltage component is completed.

9. The stable power supply device of claim 1, wherein the control unit allows remaining power of the capacitor in the high voltage component to be consumed through the heat generating resistor portion by operating only the precharge relay and the temperature raising relay among the relays constituting the power relay assembly after ignition of the vehicle is off.

10. The stable power supply device of claim 1, wherein the heat generating resistor portion is connected to the high voltage battery through the first branch circuit.

11. The stable power supply device of claim 1, wherein the precharge heat generating resistor is disposed together with the heat generating resistor portion to surround a battery module of the high voltage battery, thereby performing the heating function as a heater for raising the temperature of the battery.

12. A stable power supply device for a high voltage battery system in a vehicle, the stable power supply device comprising:

a heat generating resistor portion connected to a high voltage battery through a power relay assembly constituted of two or more relays;

a first branch circuit branched from a first connection between the high voltage battery and the power relay assembly to be connected to a second connection between the heat generating resistor portion and the power relay assembly;

a precharge heat generating resistor installed in the first branch circuit, the precharge heat generating resistor preventing a sudden flow of current by delaying an increase in voltage at an initial stage of ignition;

a high voltage component installed in a second branch circuit branched from an internal circuit of the power relay assembly, the high voltage component having a capacitor connected to the internal circuit of the power relay assembly; and a control unit connected to the power relay assembly to control an operation of each relay constituting the power relay assembly, wherein the power relay assembly includes:

a first main relay connected to a positive electrode terminal of the high voltage battery;

a second main relay connected to a negative electrode terminal of the high voltage battery;

a precharge relay connected between the first main relay and the heat generating resistor portion; and a temperature raising relay connected between the second main relay and the heat generating resistor portion, wherein the heat generating resistor portion is connected to a circuit between the precharge heat generating resistor and the precharge relay.

* * * * *